(12) United States Patent
Jewitt

(10) Patent No.: US 7,187,475 B1
(45) Date of Patent: Mar. 6, 2007

(54) SYSTEM AND METHOD FOR A ROBUST DE-SCREENING FILTER

(75) Inventor: Thomas W. Jewitt, Ayer, MA (US)

(73) Assignee: Zoran Corporation, Sunnyvale, CA (US)

( * ) Notice: Subject to any disclaimer, the term of this patent is extended or adjusted under 35 U.S.C. 154(b) by 1157 days.

(21) Appl. No.: 09/675,265

(22) Filed: Sep. 28, 2000

(51) Int. Cl.
H04N 1/405 (2006.01)
(52) U.S. Cl. ...................... 358/3.2; 358/3.07
(58) Field of Classification Search ...... 358/3.06–3.09, 358/1.9, 3.13–3.2, 534–536, 515–523; 382/237
See application file for complete search history.

(56) References Cited

U.S. PATENT DOCUMENTS

| | | | | |
|---|---|---|---|---|
| 4,194,221 A | * | 3/1980 | Stoffel | 358/3.08 |
| 4,288,821 A | * | 9/1981 | Lavallee et al. | 358/3.07 |
| 5,384,648 A | * | 1/1995 | Seidner et al. | 358/534 |
| 5,799,112 A | * | 8/1998 | de Queiroz et al. | 382/254 |
| 5,956,470 A | * | 9/1999 | Eschbach | 358/1.9 |
| 6,850,651 B2 | * | 2/2005 | Zaklika et al. | 382/275 |
| 6,950,211 B2 | * | 9/2005 | Trifonov et al. | 358/3.26 |

FOREIGN PATENT DOCUMENTS

EP 301786 A1 * 2/1989

OTHER PUBLICATIONS

"Elementary Digital Filter Theory," Adapted from "Techniques for Digital Filter Design and System Identification . . . " J.O. Smith Ph.D. Dissertation, Dept of EE, Stanford University, Jun. 1983, 20 pgs.
"Color Technology for Electronic Imaging Devices," Henry Kang, SPIE Press, Mar. 1997, 5 pgs.
"Convolution Filtering," in Sun Microsystems Programming in Advanced Imaging, Ch.apter 7.7, Jul. 1999, 12 pgs.

* cited by examiner

Primary Examiner—Thomas D. Lee
Assistant Examiner—Stephen Brinich
(74) Attorney, Agent, or Firm—Blakely Sokoloff Taylor & Zafman, LLP

(57) ABSTRACT

A method and apparatus for de-screening a halftone image, therefore allowing the recovery of an approximation of an original image, is disclosed. A method according to one embodiment first performs a screen conversion filter upon a scanned representation of the halftone image to produce an intermediate image. This method then performs a line smoothing filter upon the intermediate image to produce an approximation to the original image.

In an alternate embodiment, the method performs a single convolution filter upon a scanned representation of the halftone image to produce an approximation to the original image. In this embodiment, the single convolution filter is equal to the resulting convolution of first performing a screen conversion filter and then performing a line smoothing filter.

21 Claims, 13 Drawing Sheets

Traditional Screen Angles $$b_{ij} = \sum_{k=-1}^{1}\sum_{l=-1}^{1} a_{(i+k)(j+l)} c_{kl} =$$
$$= a_{(i-1)(j+1)} + a_{(i+1)(j-1)} + 2a_{ij}$$

$c_{-1,1} = c_{1,-1} = 1$
$c_{0,0} = 2$
All other $c_{kl} = 0$ $$b_{ij} = \sum_{k=-1}^{1}\sum_{l=-1}^{1} a_{(i+k)(j+l)} c_{kl} =$$
$$= a_{(i+1)(j+1)} + a_{(i-1)(j-1)} + 2a_{ij}$$

$c_{-1,-1} = c_{1,1} = 1$
$c_{0,0} = 2$
All other $c_{kl} = 0$

FIGURE 8: IMAGE SCANNED USING THE ASTRA 2400S
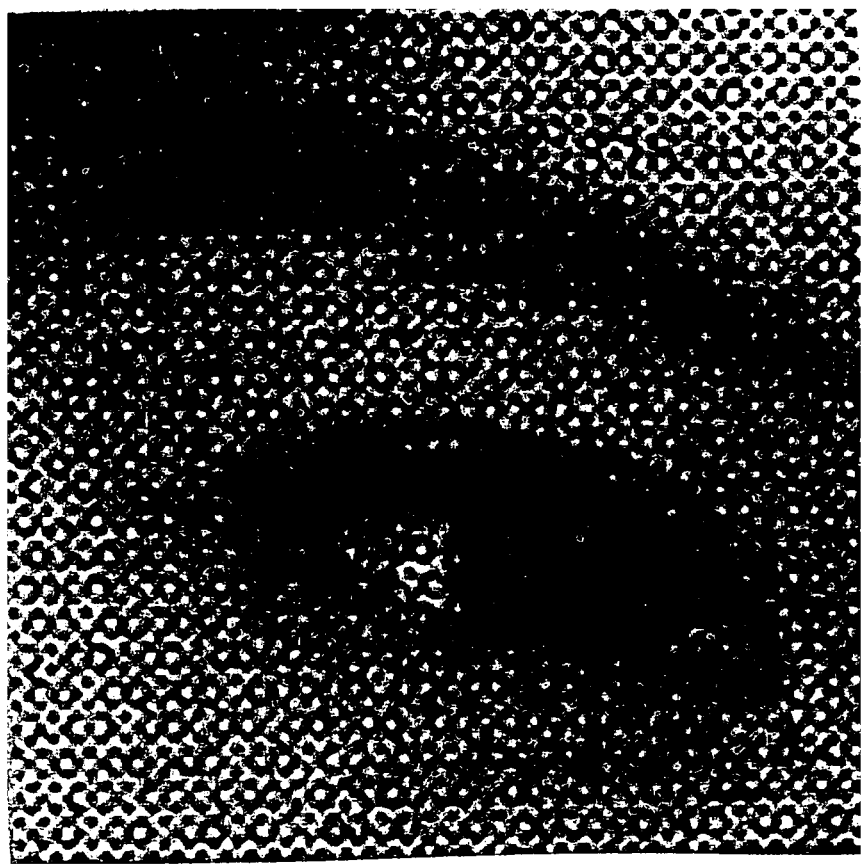

FIGURE 9: OUTPUT OF FIRST CONVOLUTION FILTER
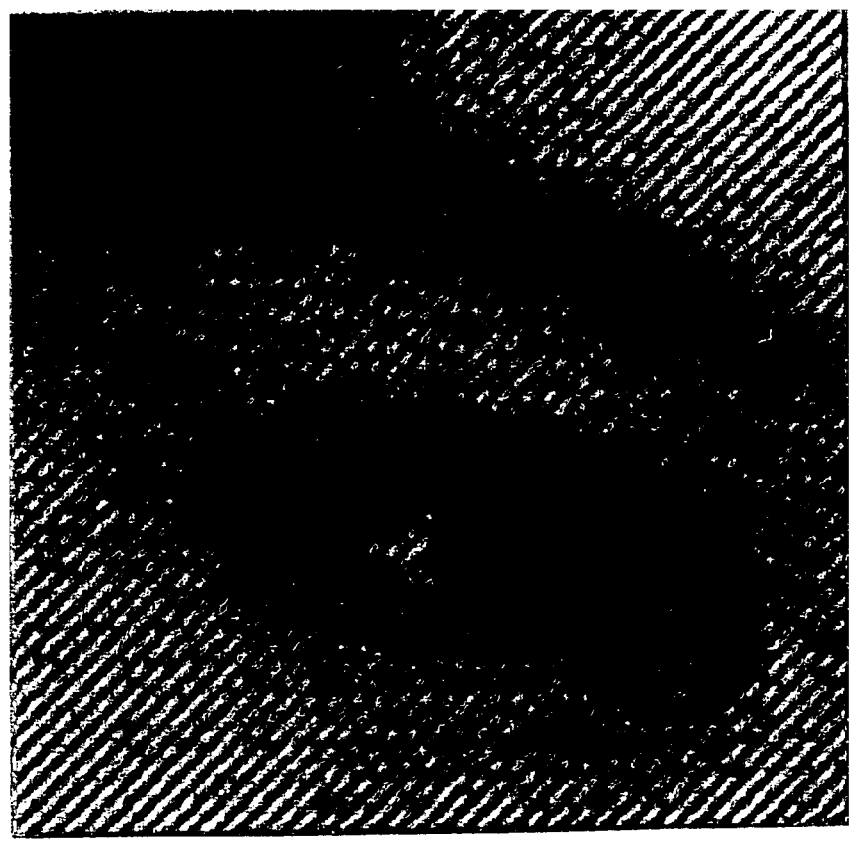

FIGURE 10: OUTPUT OF SECOND CONVOLUTION FILTER
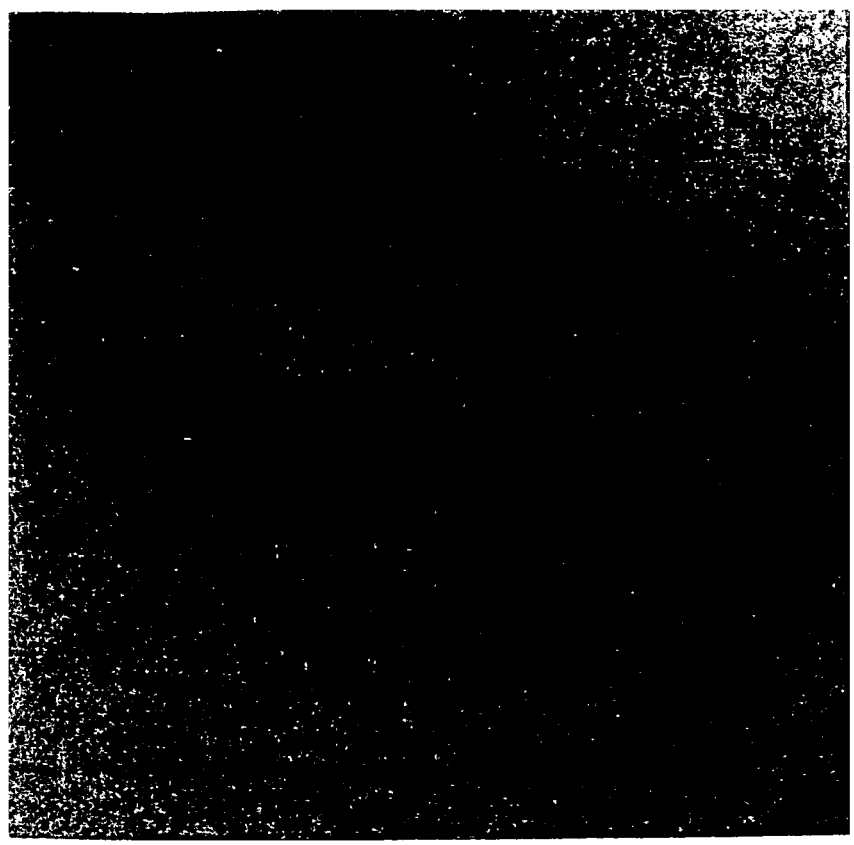

FIGURE 11: SCREEN CONVERSION FILTER FREQUENCY RESPONSE
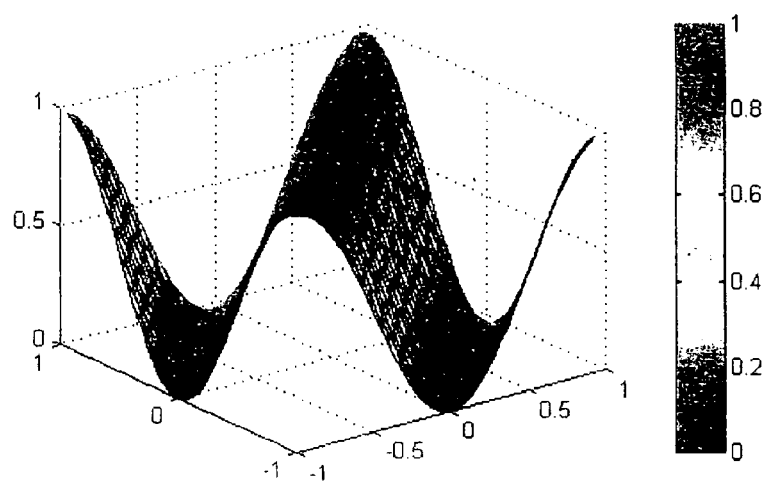

FIGURE 12: LINE SMOOTHING FILTER FREQUENCY RESPONSE
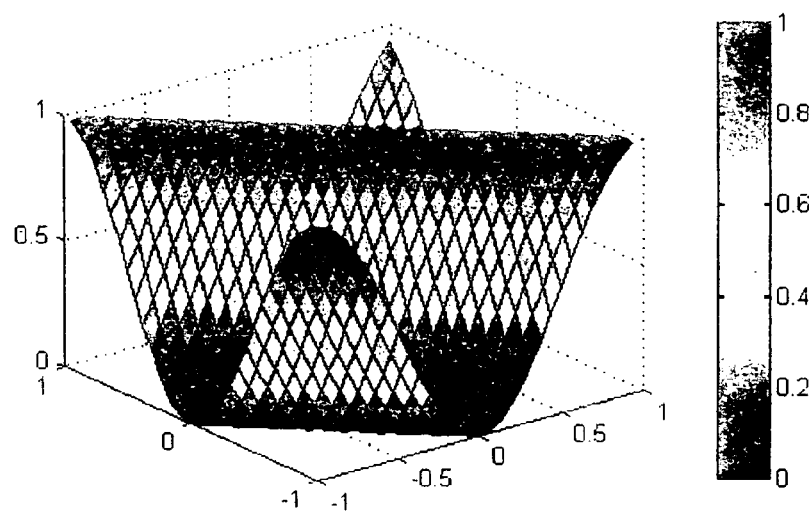

FIGURE 13: DESCREENING FILTER FREQUENCY RESPONSE
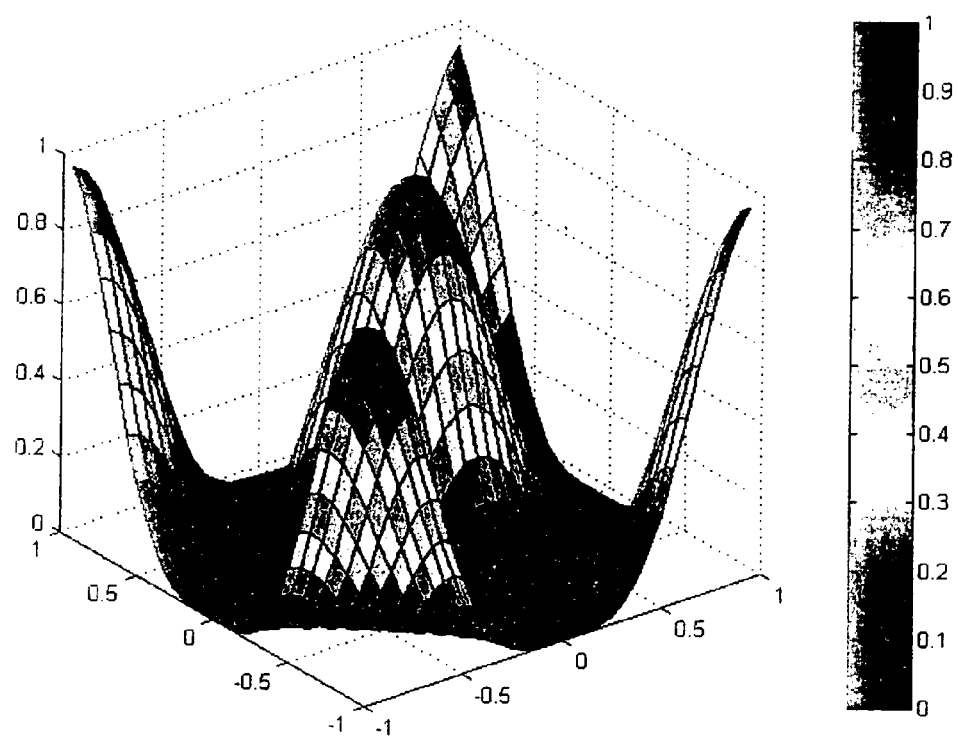

SYSTEM AND METHOD FOR A ROBUST DE-SCREENING FILTER

FIELD OF THE INVENTION

The present invention relates to halftone printing technology, and more specifically, to undoing the effects of halftone printing technology.

BACKGROUND

Photographic images may be printed onto photographic film with great ease. All that is required is an optical path and unexposed film. In contrast with this, printing onto with a finite number of inks or wax transfers requires a technique that allows for gradation of shades with a single ink color. Each ink gives only the possibility of being applied (full intensity) or not being applied (zero intensity).

Perhaps the most common technique for allowing gradation of shades is the halftone system. In the halftone system, to emulate a gray midway between black and white, a small number of dots is printed on a white background. The ratio of the area covered by the dots to the area left uncovered determines how gray is the area.

Referring now to FIG. 1, a diagram of a photographic film based halftone system is shown. Other halftone systems may utilize digital techniques, but the outcome is approximately the same. In the FIG. 1 example, an original print 100 has medium gray area 102, light gray area 106, dark gray area 104, white area 110, and black area 108. The original print 100 is projected via lens 120 onto a contact screen 124 and finally onto a film negative 142. The contact screen is a precision piece of film with a pattern of transparent areas 126 alternating in a grid with opaque areas 128. The contact screen is so constructed that the opacity gradually changes from total in opaque areas 128 to not opaque in transparent areas 126.

In a controlled exposure, light coming from a white area 110 is intense enough that the entire area 138 is exposed (blackened on a negative). But with no light coming from a black area 108 the area 140 is not exposed at all (stays white on a negative). In a medium gray area 102, the reflected light is strong enough to expose the film negative 136 in much of the area adjacent to the corresponding transparent areas of contact screen 124 but not strong enough to expose the film negative 142 in the area adjacent to the corresponding opaque areas of contact screen 124. This yields an area of medium-sized dots 132. For the light gray area 106 the exposure yields an area of larger dots 134, and for the dark gray area 104 the exposure yields an area of smaller dots 136.

The film negative 142 may be used as a printing master, with the black areas etched so that only the white areas can carry the ink. When viewed from a suitable distance, an image printed from film negative 142 has a corresponding replica of the original print 100. When viewed from a suitable distance, the replica will look like the original print 100 to a viewer.

The FIG. 1 discussion was concerned with traditional optics and photographic film. A similar process may be performed with digital technology, wherein the contact screen is replaced by a digital sampling technique. The resulting dotted image may be used to generate a printing master in an analogous manner.

Referring now to FIG. 2, a diagram showing screen angles in a color halftone system is shown. The FIG. 1 discussion was for a black and white image. When printing color images, additional complications arise. Printing in color requires the use of the three subtractive primary colors, cyan (C), magenta (M), and yellow (Y). To achieve the best results, a fourth ink, black (K) is added to the CMY palate, creating a CMYK palate.

Four separate exposures, under different colored lights, create four separate film negatives for use as printing masters. However, printing inks are somewhat opaque, and if the same orientation of the contact screen is used for each color, what you will see is a print with the dots stacked one on top of the other. The dot printed last would be most visible. Therefore, the contact screen is rotated by an angle prior to the exposures that create the C film negative, the M film negative, the Y film negative, and the K film negative. The best results occur when there is a 30 degree angle between the exposures. However, with four colors this is not possible. A best compromise has been found where the C, M, and K exposures are made with the contact screen rotated by 30 degrees between exposures, and by making the Y exposure with the contact screen midway between the C and M angles. One such possibility is shown in FIG. 2. When the corresponding film negatives are converted into printing masters, a four-color CMYK halftone print may be printed.

Problems arise when the resulting CMYK halftone print is itself a candidate for subsequent scanning. When the resulting scanned image is used for either printing or direct electronic use, such as posting the image on a web page, the halftone nature of the source image will cause poor quality in either of the resulting images. Such subsequent scanning and printing or other use may take place in a computer system with a scanner and laser printer, or may take place in a digital photocopier. In each case complications arise because the CMYK halftone print has already gone through the halftone process. After scanning, subsequent attempts with screening processes may produce a poor subsequent halftone print, with blurry areas and the possibility of Moire effects. These effects are well-known to anyone who has attempted to make a photocopy of a halftone print. Similarly, after scanning, subsequent use as an electronic image on a web page will exhibit poor image quality.

Prior art techniques for avoiding these problems have been limited by a requirement of either knowing detailed information about how the source halftone print was produced, or by using an inefficient trial-and-error method. The detailed information required may include the screen frequency (inversely proportional to the distance between transparent areas in a contact screen), screen angles (such as shown in FIG. 2), the shape of the halftone dots, and many other parameters. It is highly unlikely that a copy machine operator would know the values of these parameters or even what they are. There are currently about 20 halftone screening procedures in common use, and each requires a specific procedure to undo the effects of the halftone screening. The large number of these procedures may make their use on a trial-and-error basis very time consuming.

SUMMARY OF THE INVENTION

A method and apparatus for de-screening a halftone image, therefore allowing the recovery of an approximation of an original image, is disclosed. A method according to one embodiment first performs a screen conversion filter upon a scanned representation of the halftone image to produce an intermediate image. This method then performs a line smoothing filter upon the intermediate image to produce an output image that approximates an original image.

In an alternate embodiment, the method performs a single convolution filter upon a scanned representation of the halftone image to produce an output image. In this embodiment, the single convolution filter is equal to the resulting convolution of first performing a screen conversion filter and then performing a line smoothing filter.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is a diagram of a scanned image of one embodiment of the present invention.

FIG. 9 is a diagram of an output image from a first filter according to one embodiment of the present invention.

FIG. 10 is a diagram of an output image from a second filter according to one embodiment of the present invention.

FIG. 11 is a graph of a first convolution filter frequency response according to one embodiment of the present invention.

FIG. 12 is a graph of a second convolution filter frequency response according to one embodiment of the present invention.

FIG. 13 is a graph of a combined filter frequency response according to another embodiment of the present invention.

DETAILED DESCRIPTION

A system and method for recreating a source image from an existing ("parent") halftone print is described. This method will be referred to as a "de-screening" process, because it aims to undo the effects created in a prior operation by a halftone contact screen or its digital equivalent. A system using this method will be referred to as a "de-screening filter". In the de-screening process, detailed knowledge of the prior halftone process is not necessary to create a subsequent ("daughter") halftone print in a laser printer or photocopier.

The de-screening process begins with the scanning of the parent halftone print. The digital representation created by this scanning process is then processed by a screen conversion filter. The output of the screen conversion filter is then processed by a line smoothing filter. The output of the line smoothing filter is a digital representation which may serve as the digital representation of the original parent image. This digital representation of the original parent image may then be processed in a subsequent halftone process to produce a clear daughter halftone print.

Figure 3:
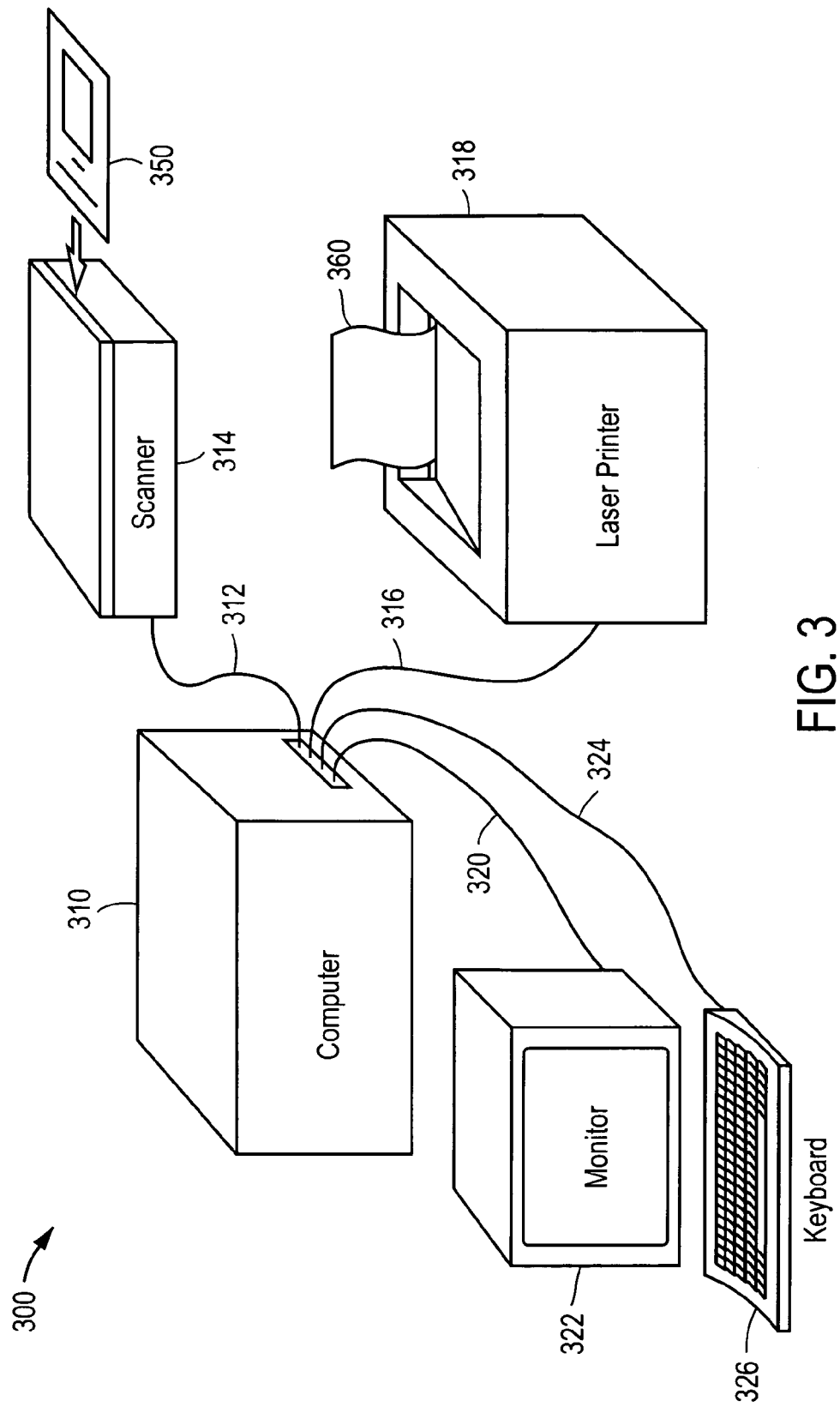
FIG. 3 is an illustration of one embodiment of a computer system.

Referring now to FIG. 3, an illustration of one embodiment of a computer system 300 of the present invention is shown. The computer system 300 includes a computer 310, a scanner 314, a laser printer 318, a monitor 322, and a keyboard 326. The component of the computer system 300 are connected via scanner interface cable 312, printer interface cable 316, monitor interface cable 320, and keyboard interface cable 324. A parent halftone print 350 may be inserted into scanner 314 for the purpose of scanning. The laser printer 318 may then produce a subsequent daughter halftone print 360. In other embodiments, the components of computer system 300 or their equivalents may be combined into a digital photocopier.

Scanner 314 may be used to produce a digital representation of the parent halftone print 350 under control of computer 310. An operator using keyboard 326 and monitor 322 may select portions of the scanned digital representation for subsequent processing and printing on laser printer 318. Computer 310 may coordinate these efforts, and, additionally, may perform the screen conversion filter and line smoothing filter operations of the present invention. In alternate embodiments, these filtering operations may be performed by embedded processors within laser printer 318 or scanner 314.

Figure 4:
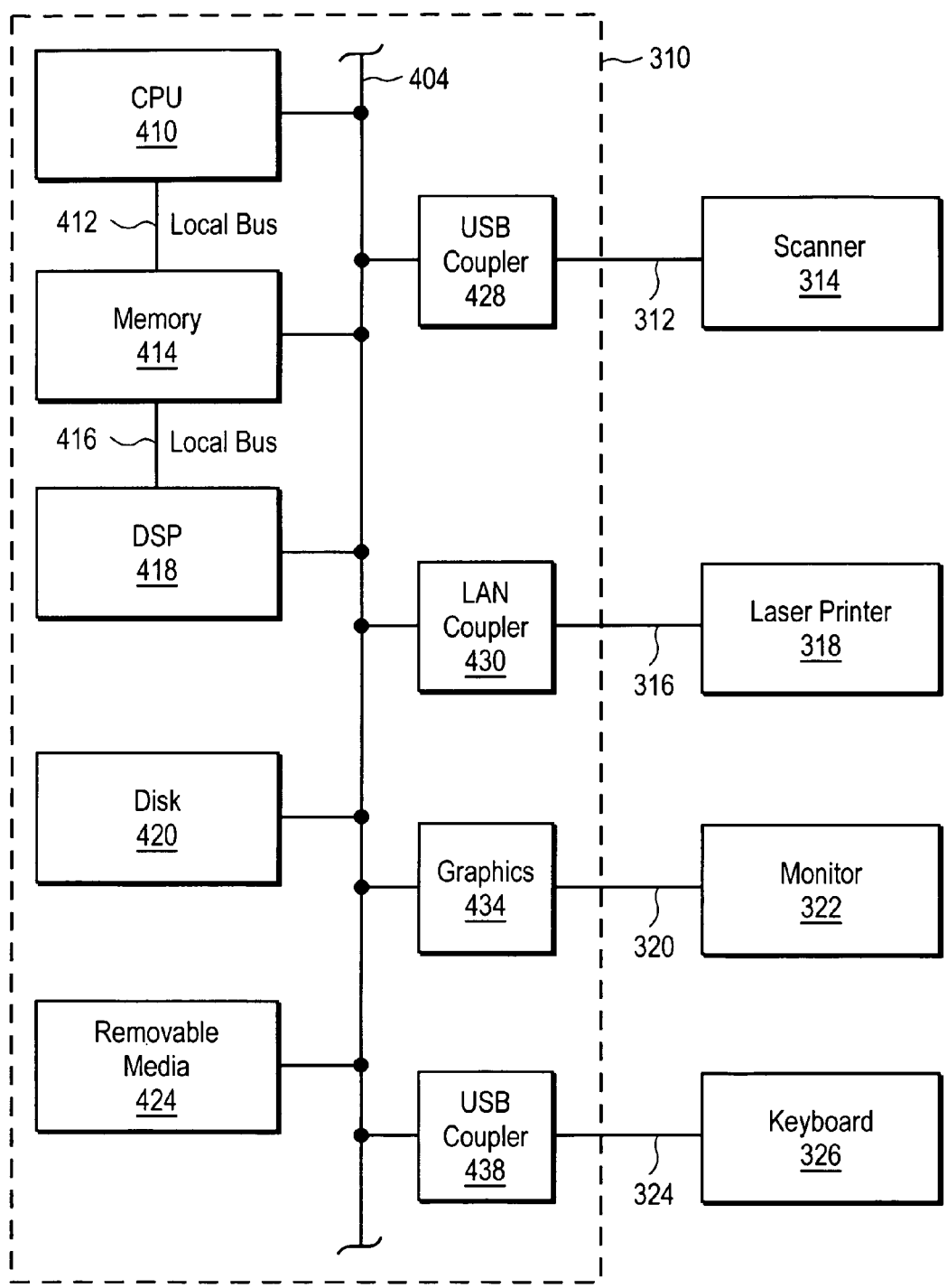
FIG. 4 is a block diagram of one embodiment of a computer system in accordance with the present invention.

Referring now to FIG. 4, a block diagram of one embodiment of a computer system is shown, in accordance with the present invention. Computer 310 may include a central processing unit (CPU) 410, a memory 414, a digital signal processor (DSP) 418, a disk 420, and a removable media 424. The CPU 410 may be a conventional complex instruction set computer (CISC) or a reduced instruction set computer (RISC). The memory 414 may be homogeneous or a mixture of kinds of memory, and may include dynamic random-access memory (DRAM), static random-access memory (SRAM), flash-programmable read-only memory (Flash), or other kinds of read-only memory (ROM). An optional DSP 418 may be included to facilitate complex numerical calculations. Disk 420 may be magnetic, optical, or magneto-optical in nature. In other embodiments, a large area of non-volatile memory may be used instead of a disk 420 for program storage. Removable media 424 may be a removable magnetic disk, a floppy disk, an optical disk, a magneto-optical disk, or a memory card.

The components of the computer 310 may be connected by a central data bus 404. Additionally, local busses may be used, such as local bus 412 between CPU 410 and memory 414, or local bus 416 between DSP 418 and memory 414. Various input/output (I/O) controllers such as universal serial bus (USB) couplers 428, 438, local area network (LAN) coupler 430, and graphics engine 434 may also be connected via data bus 404. In alternate embodiments other interfaces may be used to connect with the scanner 314, the laser printer 318, the monitor 322, and the keyboard 326.

Figure 5:
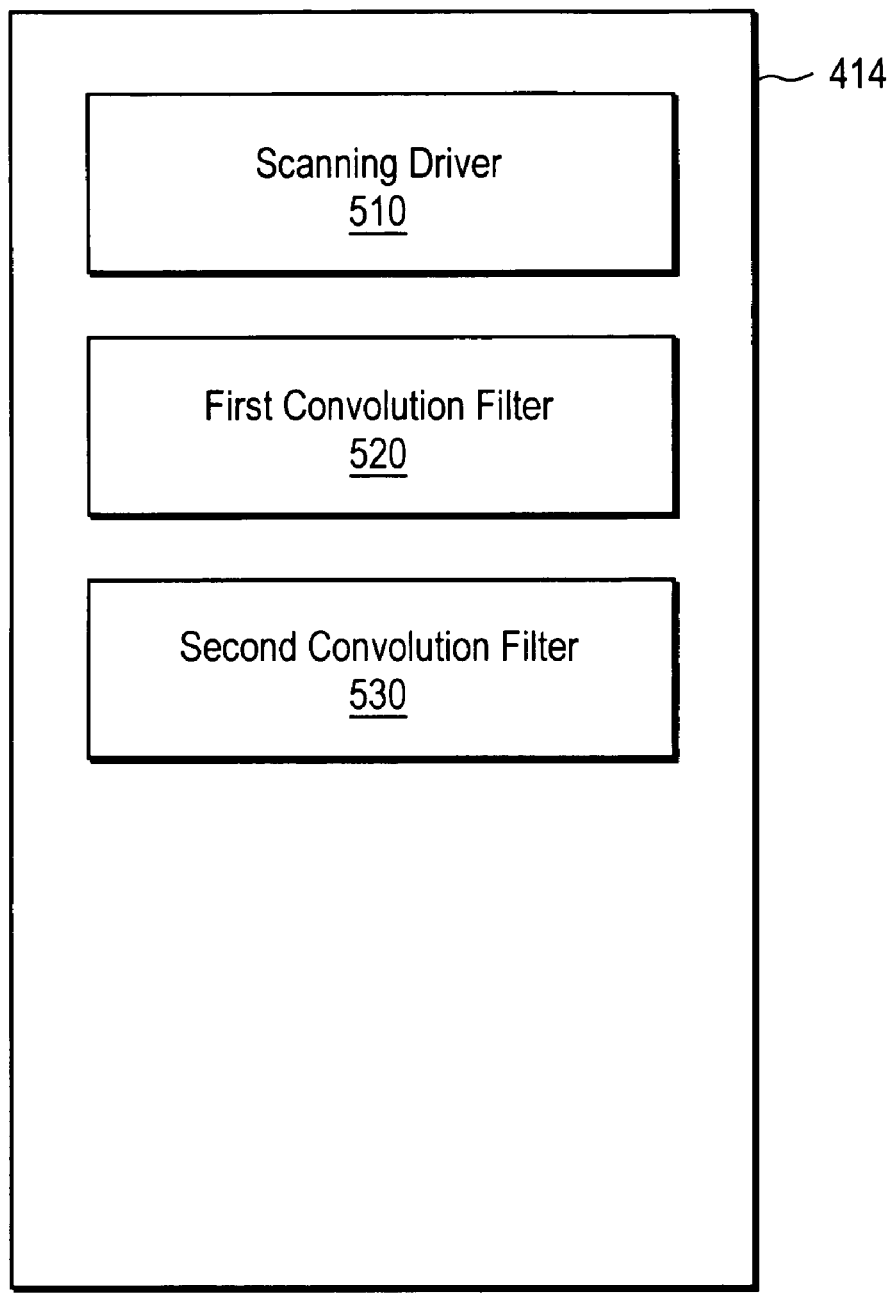
FIG. 5 is a software module diagram of one embodiment of the computer system in accordance with the present invention.

Referring now to FIG. 5, a software module diagram of one embodiment of the computer system is disclosed, in accordance with the present invention. In the FIG. 5 embodiment, the computer 310 controls the scanning performed by the scanner 314. Computer 310 also performs the screen conversion filter process and the line smoothing filter process. Software modules scanning driver 510, first convolution filter 520, and second convolution filter 530 may be resident within memory 414. In other embodiments, these three processes may be performed by a smart scanner, a smart laser printer, or by a digital photocopier.

First convolution filter 520 may serve as the screen conversion filter. In alternate embodiments, first convolution filter 520 may serve as the line smoothing filter. Second convolution filter 530 may serve as the line smoothing filter. In alternate embodiments, second convolution filter 530 may serve as the screen conversion filter. Details of these filters will be provided in connection with FIGS. 6, 7A, and 7B below.

Figure 6:
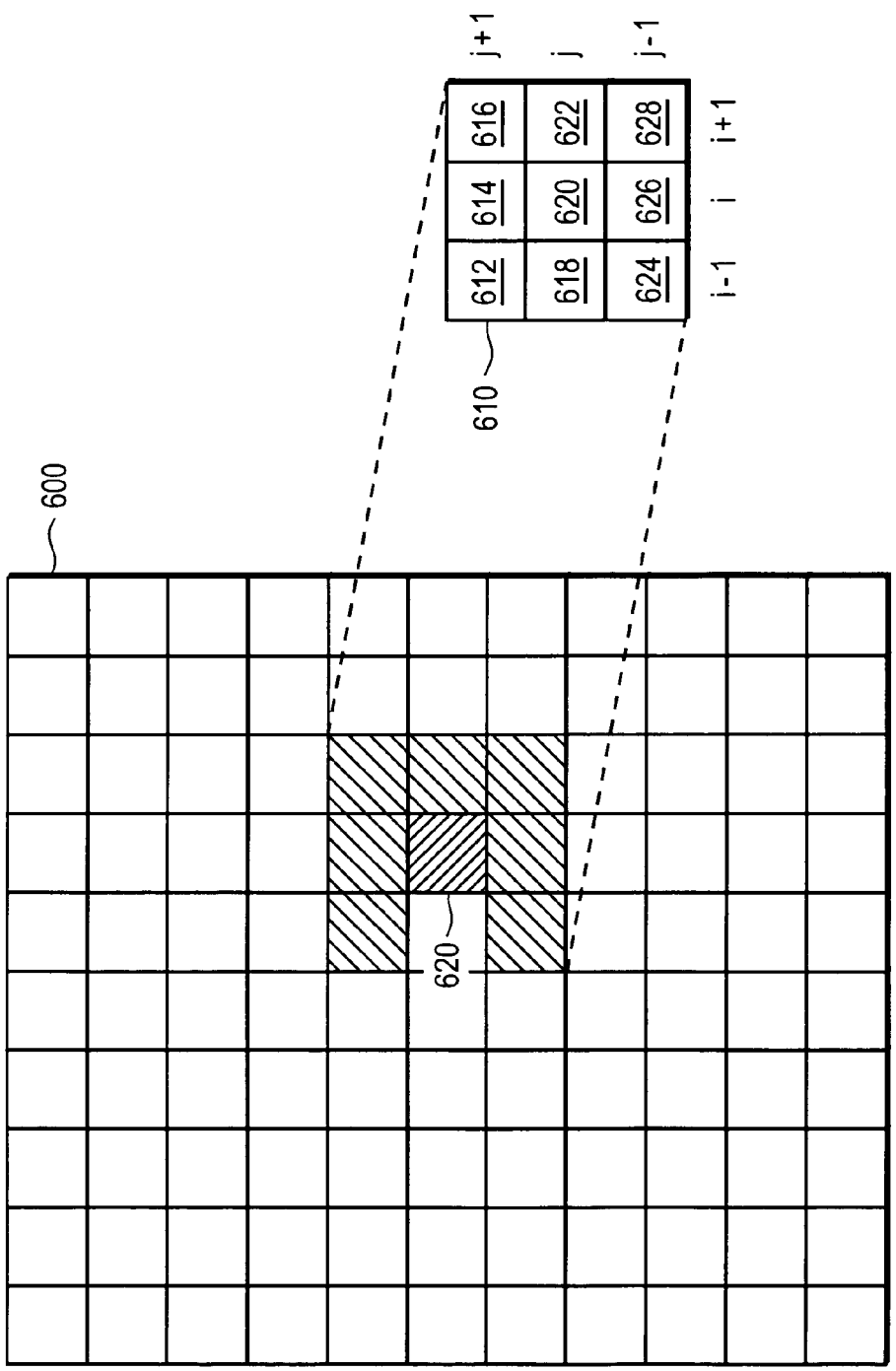
FIG. 6 is a chart illustrating the calculation of a filtered value for a pixel, according to one embodiment of the present invention.

Referring now to FIG. 6, a chart illustrating the calculation of a filtered value for a pixel is shown, according to one embodiment of the present invention. Matrix 600 represents the digital representation of the scanned halftone print. Each location within the matrix 600 is a picture element (pixel) and contains a numeric value (for monochrome scanners) or a set of three numeric values (for color scanners) representing the brightness of the pixel. In the following discussion it will be assumed that the single numeric value (monochrome) example will be discussed, but it should be noted that the three numeric value (color) embodiment merely replicates the monochrome filtering process three times.

An exemplary pixel is pixel 620, in the i'th column and j'th row of matrix 600. Pixel 620 will be used to show the operation of one of the convolution filters. Let the original numeric value in pixel 620 be $a_{ij}$. The filtered value for the pixel 620 may be called $b_{ij}$. The value of $b_{ij}$ is derived by taking a linear combination of $a_{ij}$ and the values of the 8 neighboring pixels 612, 614, 616, 618, 622, 624, and 628 in a 3 by 3 submatrix 610 of matrix 600. In other embodiments, submatrix 610 may be a 4 by 4 submatrix, a 5 by 5 submatrix, or any other size submatrix. The matrix of all the $b_{ij}$ (not shown) is the output matrix of the convolution filter.

Figures 7A, 7B:
FIG. 7A is a diagram of a first convolution filter according to one embodiment of the present invention.
FIG. 7B is a diagram of a second convolution filter according to one embodiment of the present invention.

Referring now to FIG. 7A, a diagram of a first convolution filter is shown, according to one embodiment of the present invention. In this embodiment, the filter of FIG. 7A forms a screen conversion filter. In alternate embodiments, the filter of FIG. 7A may be used as a line smoothing filter. Coefficient matrix 700 contains the constant coefficients which will be used in the first convolution filter. The elements of coefficient matrix 700 are zero everywhere except on the diagonal going from upper left to lower right. Here $c(+1, -1)=c(-1, +1)=1$, and $c(0, 0)=2$. The coefficients are multiplied by the corresponding pixel's numeric values in each submatrix. All these products are then summed to give the output numeric value $b_{ij}$. The double summation in the equation of FIG. 7A collapses to a simple sum, since $2a_{ij}=a_{ij}+a_{ij}$. Therefore the first convolution filter of FIG. 7A may be calculated in an efficient manner with three additions and no multiplications.

Referring now to FIG. 7B, a diagram of a second convolution filter is shown, according to one embodiment of the present invention. In this embodiment, the filter of FIG. 7B forms a line smoothing filter. In alternate embodiments, the filters of FIGS. 7A and 7B may be reversed, with the filter of FIG. 7B being used as the screen conversion filter. Coefficient matrix 750 contains the constant coefficients which will be used in the second convolution filter. The elements of coefficient matrix 750 are zero everywhere except on the diagonal going from lower left to upper right. Here $c_{(+1, +1)}=c_{(-1, -1)}=1$, and $c_{(0, 0)}=2$. As in the case of the first convolution filter of FIG. 7A, the coefficients are multiplied by the corresponding pixel's numeric values in each submatrix. All these products are then summed to give the output numeric value $b_{ij}$. The double summation in the equation of FIG. 7B again collapses to a simple sum, since $2a_{ij}=a_{ij}+a_{ij}$. Therefore the second convolution filter of FIG. 7B may also be calculated in an efficient manner with three additions and no multiplications.

Figure 1:
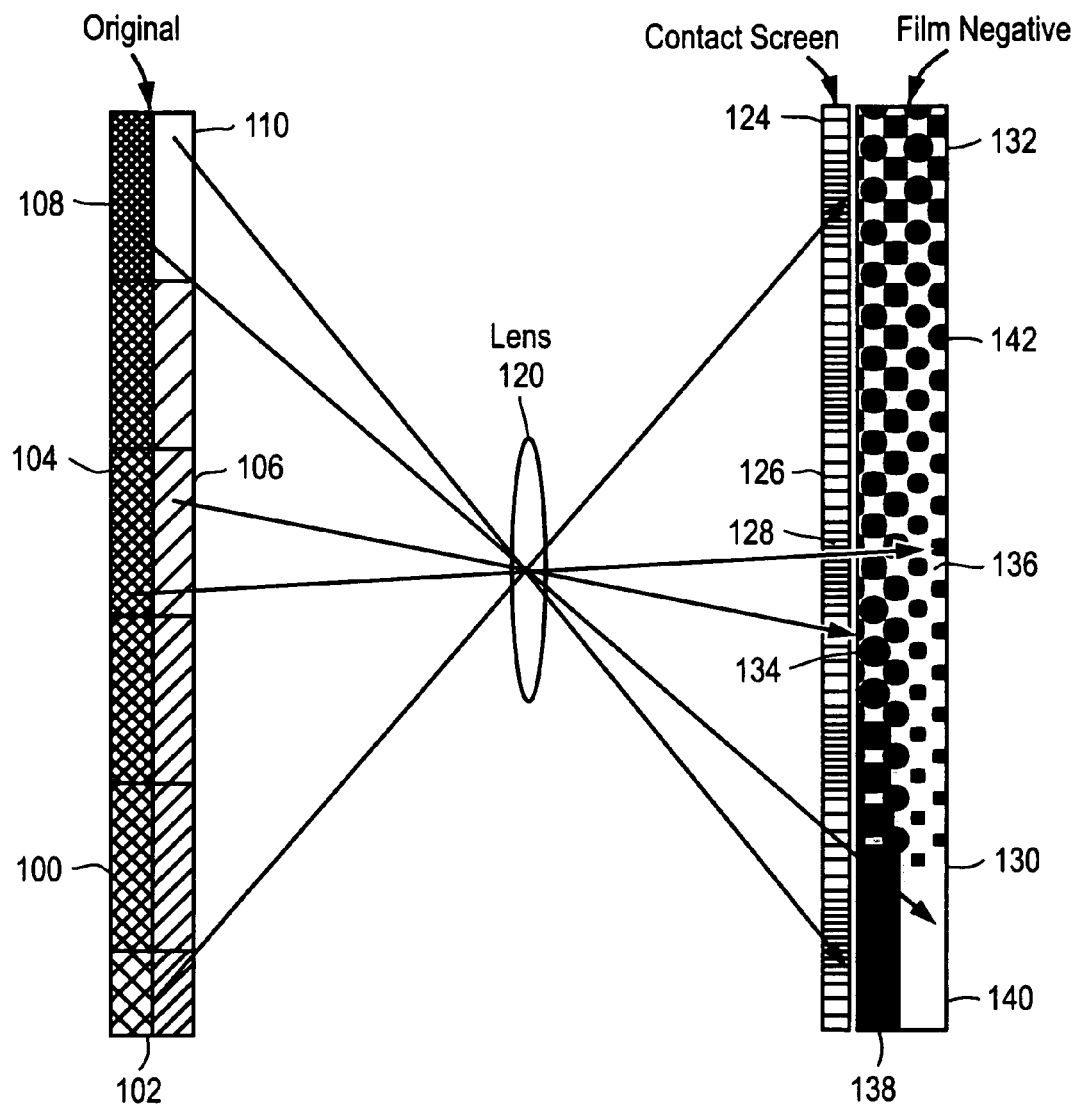
FIG. 1 is a diagram of a photographic film based halftone system.
Figure 2:
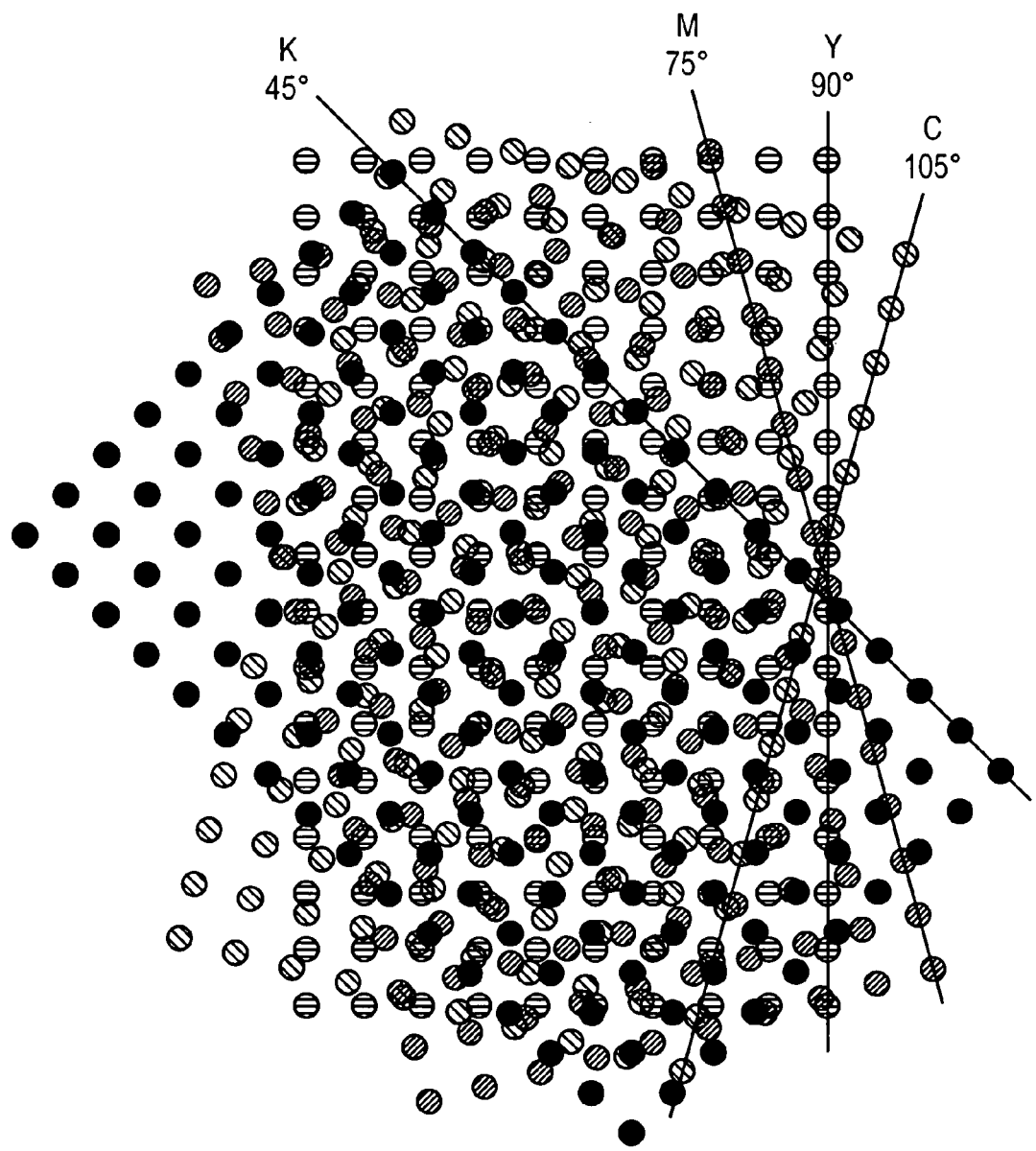
FIG. 2 is a diagram showing screen angles in a color halftone system.

Referring now to FIG. 8, a diagram of a scanned image of one embodiment of the present invention is shown. In the FIG. 8 example, a CMYK halftone print has been created using a method similar to that outlined in the discussions of FIG. 1 and FIG. 2 above. The round "rosette" marks are common to halftone prints when examined at great magnification. The halftone print has been digitally scanned and the resulting data placed into a pixel matrix similar to that shown in FIG. 6 above. What is shown in FIG. 8 is the resulting image if this pixel matrix were printed directly onto a high-resolution laser printer.

Referring now to FIG. 9, a diagram of an output image from a first convolution filter is shown, according to one embodiment of the present invention. In the FIG. 9 example, the data representing the image of FIG. 8 was processed in a first convolution filter, such as that shown in FIG. 7A, used as a screen conversion filter. The FIG. 7A filter, when used in this manner, produces lines along a 45 degree angle. It should be noted that the FIG. 9 image is for illustration only as this is an intermediary result. In other embodiments, using the FIG. 7B filter as a screen conversion filter may produce lines along a 135 degree angle.

It is noteworthy that the filtering as shown in the FIG. 9 example does not produce Moire patterns. The resulting lines along the 45 degree angle (or 135 degree angle) are parallel and thus have an angle of 0 degrees between them. It is well-known in the art that patterns of intersecting lines intersecting at an angle of $\theta$ may produce Moire patterns with a interference period T given by $T=K/\sin(\theta/2)$, where K is a constant of proportion. Since in the present example $\theta=0$, and since $\sin(0)=0$, the interference period T is infinite. Hence the use of the FIG. 7A filter to produce the exemplary image of FIG. 9 has the benefit of preventing Moire effects.

Referring now to FIG. 10, a diagram of an output image from a second filter is shown, according to one embodiment of the present invention. This image presumes that the FIG. 9 filtering was first performed with the filter of FIG. 7A. The FIG. 10 filtering, the line smoothing filtering step, would then be accomplished with the filter of FIG. 7B. In an alternate embodiment, the FIG. 7B filter would be used as the screen conversion filter followed by the FIG. 7A filter as the line smoothing filter.

The image shown in FIG. 10 is an exemplary final result of the filtering process of the present invention. From the point of view of a subsequent laser printer or photocopier, this image loses most of the artifacts originally introduced by the halftone process. In effect, the artifacts introduce by the halftone screens have been removed, which leads to the filtering process of the present invention being referred to as a "de-screening filter". In no part of the de-screening process were the original parameters of the halftone process required. The de-screening process of the present invention works independently of any previous halftone screening processes.

Referring now to FIG. 11, a graph of a first filter frequency response is shown, according to one embodiment of the present invention. This graph illustrates the frequency response of the filter of FIG. 7A. If the input values $a_{ij}$ at each location of a matrix are considered as a function of a two dimensional discrete-valued variable, then the frequency response of the filter of FIG. 7A may be derived using techniques well-known in the art. The frequency response curve shown in FIG. 11 has the result of passing low-frequencies, passing high-frequencies along the diagonal line from lower left to upper right, and attenuating high-frequencies away from this diagonal line (e.g. along the horizontal and vertical axis). Alternate filters to that of FIG.

7A may be used when the alternate filter has a frequency response curve similar to that shown in FIG. 11.

Referring now to FIG. 12, a graph of a second filter frequency response is shown, according to one embodiment of the present invention. This graph illustrates the frequency response of the filter of FIG. 7B. The frequency response curve shown in FIG. 12 has the result of passing low-frequencies, passing high-frequencies along the diagonal line from lower right to upper left, and attenuating high-frequencies away from this diagonal line (e.g. along the horizontal and vertical axis). Alternate filters to that of FIG. 7B may be used when the alternate filter has a frequency response curve similar to that shown in FIG. 12.

Referring now to FIG. 13, a graph of a combined filter frequency response is shown, according to another embodiment of the present invention. In this alternate embodiment, instead of the two cascaded filters of FIG. 7A and FIG. 7B, a single convolution filter may be utilized. The single convolution filter of the FIG. 13 embodiment may have a frequency response as given in FIG. 13 or a frequency response similar to that given in FIG. 13. The derivation of filter coefficients for use in a coefficient matrix, similar to coefficient matrices 700, 750, from a given frequency response graph is well-known in the art.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for de-screening a halftone image, comprising:
    performing screen conversion filtering to convert dots of a scanned representation of said halftone image to produce parallel lines of an intermediate image; and
    performing line smoothing filtering upon said intermediate image to produce an output image.

2. The method of claim 1, wherein said screen conversion filter utilizes a 3 by 3 coefficient matrix.

3. The method of claim 2, wherein said coefficient matrix is diagonal along the lower right to upper left direction.

4. The method of claim 3, wherein coefficients $c_{(-1,\ 1)} = c_{(1,\ -1)} = 1$, and coefficient $c_{(0,\ 0)} = 2$.

5. The method of claim 2, wherein said coefficient matrix is diagonal along the lower left to upper right direction.

6. The method of claim 3, wherein coefficients $c_{(-1,\ -1)} = c_{(1,\ 1)} = 1$, and coefficient $c_{(0,\ 0)} = 2$.

7. The method of claim 1, wherein said line smoothing filter utilizes a 3 by 3 coefficient matrix.

8. The method of claim 7, wherein said coefficient matrix is diagonal along the lower right to upper left direction.

9. The method of claim 8, wherein coefficients $c_{(-1,\ 1)} = c_{(1,\ -1)} = 1$, and coefficient $c_{(0,\ 0)} = 2$.

10. The method of claim 9, wherein said coefficient matrix is diagonal along the lower left to upper right direction.

11. The method of claim 10, wherein coefficients $c_{(-1,\ -1)} = c_{(1,\ 1)} = 1$, and coefficient $c_{(0,\ 0)} = 2$.

12. The method of claim 1, wherein said screen conversion filter passes low-frequencies, passes high-frequencies along a diagonal line from lower left to upper right, and attenuates high-frequencies away from said diagonal line.

13. The method of claim 1, wherein said screen conversion filter passes low-frequencies, passes high-frequencies along a diagonal line from lower right to upper left, and attenuates high-frequencies away from said diagonal line.

14. The method of claim 1, wherein said line smoothing filter passes low-frequencies, passes high-frequencies along a diagonal line from lower left to upper right, and attenuates high-frequencies away from said diagonal line.

15. The method of claim 1, wherein said line smoothing filter passes low-frequencies, passes high-frequencies along a diagonal line from lower right to upper left, and attenuates high-frequencies away from said diagonal line.

16. A method for de-screening a halftone image, comprising:
    performing single convolution filtering upon a scanned representation of said halftone image to produce an output image, wherein a result of said single convolution filter equals the combined results obtained from a convolution of a separate screen conversion filter and a line smoothing filter, wherein said single convolution filter passes low-frequencies, passes high-frequencies at a central area, and attenuates high-frequencies along a horizontal axis and a vertical axis.

17. A computer-readable medium having stored thereon sequences of instructions, the sequences of instructions including instructions which, when executed by a processor, causes the processor to perform various processing, the sequences of instructions comprising:
    a first sequence to perform screen conversion filtering to convert dots of a scanned representation of said halftone image to produce parallel lines of an intermediate image; and
    a second sequence to perform line smoothing filtering upon said intermediate image to produce an output image.

18. A computer-readable medium having stored thereon sequences of instructions, the sequences of instructions including instructions which, when executed by a processor, causes the processor to perform various processing, the sequences of instructions comprising:
    a first sequence to perform single convolution filtering upon a scanned representation of a halftone image to produce an output image, wherein said single convolution filter equals the resulting convolution of a screen conversion filter and a line smoothing filter, wherein said single convolution filter passes low-frequencies, passes high-frequencies at a central area, and attenuates high-frequencies along a horizontal axis and a vertical axis.

19. A system for de-screening a halftone image, comprising:
    a memory to store an input image from a halftone print; and
    a processor to perform a screen conversion filter to convert dots of said input image and create parallel lines of an intermediate image, and to perform a line smoothing filter upon said intermediate image and create an output image.

20. A method for de-screening a halftone image, comprising:
    converting dots of said halftone image into parallel lines of an intermediate image; and
    smoothing said parallel lines of said intermediate image into a final image.

21. The method of claim 20, wherein said parallel lines are at an approximately 45 degree angle with respect to a side of said intermediate image.

* * * * *